Figures 1, 2:
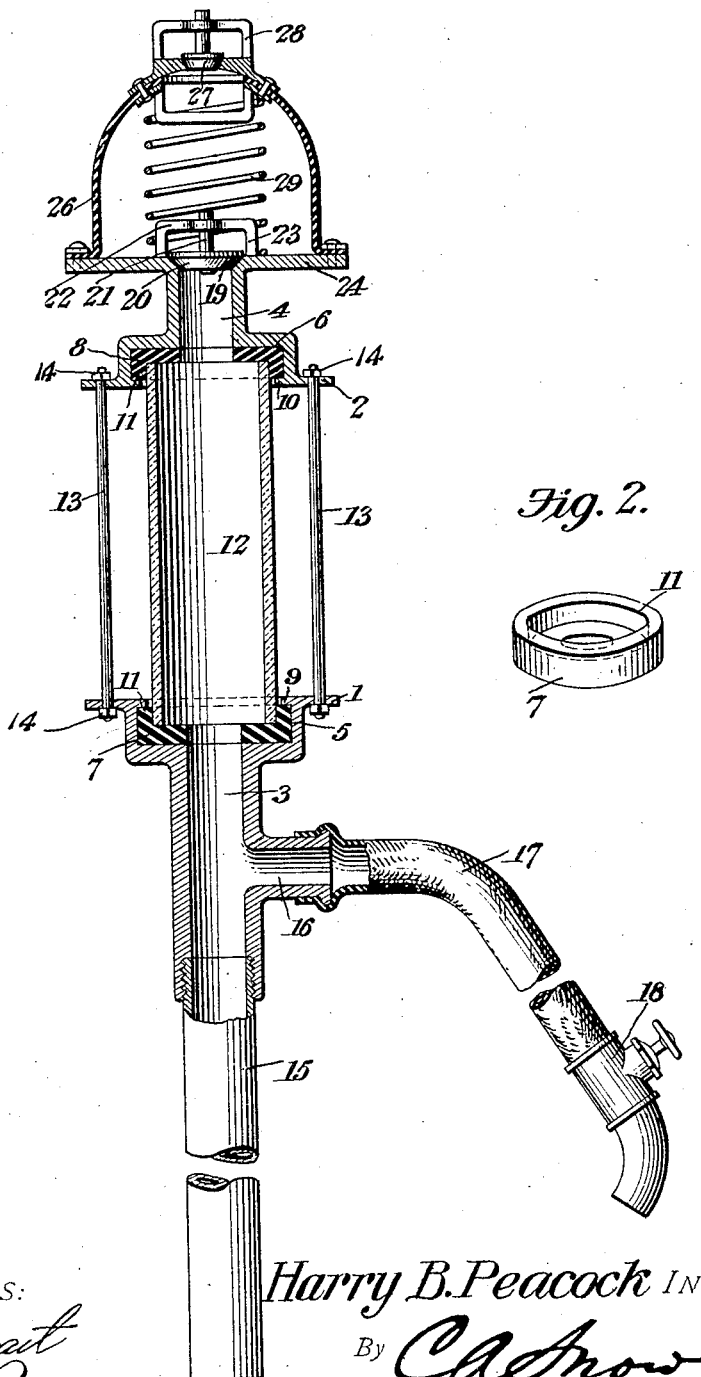

No. 851,898. PATENTED APR. 30, 1907.
H. B. PEACOCK.
SIPHON.
APPLICATION FILED JAN. 19, 1906.

WITNESSES:

Harry B. Peacock INVENTOR

By
ATTORNEYS

UNITED STATES PATENT OFFICE.

HARRY B. PEACOCK, OF EASTON, PENNSYLVANIA.

SIPHON.

No. 851,898.  Specification of Letters Patent.  Patented April 30, 1907.

Application filed January 19, 1906. Serial No. 296,863.

*To all whom it may concern:*

Be it known that I, HARRY B. PEACOCK, a citizen of the United States, residing at Easton, in the county of Northampton and State of Pennsylvania, have invented a new and useful Siphon, of which the following is a specification.

This invention relates to siphons for drawing the contents from barrels, casks, and the like; and one object of the invention is to present a siphon provided with a sight glass whereby the liquid will be visible as it rises in the siphon; other objects of the invention are to simplify and improve the construction and operation of this class of devices.

With these and other ends in view, which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be made, when desired.

In the drawings, Figure 1 is a vertical sectional view of a siphon constructed in accordance with the principles of the invention. Fig. 2 is a perspective detail view of one of the rubber washers used in connection with the device.

Corresponding parts in the several figures are indicated throughout by similar characters of reference.

In the construction of the improved siphon there are employed two clamping members 1 and 2 having longitudinal apertures or channels 3 and 4, and provided in their opposing faces with recesses 5 and 6 affording seats for washers 7 and 8, which are retained in or upon the respective seats by means of overhanging flanges 9 and 10. The washers 7 and 8 are cup-shaped or provided with annular flanges, as 11, abutting upon the overhanging flanges 9 and 10, and said cup-shaped washers receive the ends of a glass pipe or tube 12 constituting a sight glass which is mounted securely between the clamping members 1, 2 by means of bolts 13 connecting said clamping members, and having nuts 14 by tightening which the washers will be tightened around the ends of the tube, thus producing perfectly tight joints.

Into the lower end of the member 1 is threaded a suction tube 15, and said member 1 is provided with a laterally extending branch 16 with which is connected a flexible discharge tube 17 provided with a suitable cock or spigot 18.

The member 2 is provided at the upper end of the channel 4 with a seat 19 for an upwardly opening valve 20 which has been shown as provided with a stem 21 guided through a cross bar 22 which may constitute a part of a valve cage 23. The upper end of the member 2 is expanded to form a disk 24 upon which is secured a collapsible bell or bulb 26 of rubber, or other suitable material, said bell or bulb being equipped with an upwardly opening valve 27 inclosed by and guided in a cage or cap 28, suitably constructed and connected with the bell or bulb. A spring 29 may be arranged within the latter to assist in expanding it.

In the operation of this device, the suction tube, which may be of any desired length, is inserted into the cast or vessel the liquid contents of which it is desired to move. By compressing the bell or bulb 26, the air contained in the siphon will escape under the valve 27 thus causing the external air pressure, as the bell or bulb expands, to force the liquid upward through the suction tube 15. By manipulating the bell or bulb a few times, the liquid will be caused to rise in the sight glass 12, and when it reaches a suitable height the valve or spigot 18 may be opened, thus causing the liquid to flow from the sight glass, which, it will be noted, forms a reservoir into which liquid is drawn by the operation of the air expulsion means and flows therefrom when the valve 18 is opened, in consequence of the head or pressure of the liquid in the glass. The flow of the liquid may obviously be regulated by the valve or spigot.

By locating the air expulsion means above or in communication with the upper end of the sight glass and having the suction and outlet pipes communicating with the lower end of the sight glass, the liquid can be drawn into the latter by the operation of the air expulsion means until a safe height is reached, that is to say, before liquid is drawn into the air expulsion means, as can be ascertained by the level of the liquid in the glass. This is an important feature of the present arrangement, since liquid can be positively excluded from the rubber bulb 26 of the air expulsion means, it being understood in this connection that certain liquids are extremely deleterious in their action on rubber.

Having thus described the invention, what is claimed is:—

1. In a siphon, a pair of superposed and spaced clamping members, a suction tube and a discharge tube connected with the lower one of said members, air expulsion means connected with the other member, and a sight glass clamped between the two members.

2. In a siphon, a pair of clamping members, a suction tube and a discharge tube connected with the lower member, air expulsion means connected with the upper member, cup-shaped washers seated in the two members, and a sight glass clamped between the members and engaging the cup-shaped washers.

3. In a siphon, a pair of longitudinally apertured clamping members having washer seats provided with overhanging flanges, cup-shaped washers in said seats, a sight glass engaging said washers, means for connecting the clamping members and securing them upon the sight glass, a suction tube and a valved discharge tube connected with the lower clamping member, and air expulsion means connected with the upper clamping member.

4. In a siphon, a sight glass, longitudinally apertured clamping members engaging said glass, a suction tube and a valved discharge pipe connected with one of the clamping members, an upwardly opening valve seated upon the other clamping member, and a collapsible and expansible valved bell or bulb connected with the latter clamping member.

5. In a siphon, a sight glass, longitudinally apertured upper and lower clamping members confining said glass between them, a suction tube and a discharge tube connected with the lower clamping member, an expansible and collapsible bulb secured upon the upper clamping member and having an outwardly opening valve, an upwardly opening valve seated upon the upper clamping member and constituting a closure for the longitudinal aperture therethrough, and a spring within the bulb to assist in expanding the latter.

In testimony that I claim the foregoing as my own, I have hereto affixed my signature in the presence of two witnesses.

HARRY B. PEACOCK.

Witnesses:
WILLIAM J. LITTLE,
ARTHUR RICHARDS.